(12) United States Patent
Zhang et al.

(10) Patent No.: US 9,336,829 B2
(45) Date of Patent: May 10, 2016

(54) DATA RECORDING MEDIUM, METHOD FOR GENERATING A REFERENCE CLOCK SIGNAL, AND DATA STORAGE DEVICE

(71) Applicant: MARVELL INTERNATIONAL LTD., Hamilton (BM)

(72) Inventors: Jingliang Zhang, Singapore (SG); Siang Huei Leong, Singapore (SG); Zhimin Yuan, Singapore (SG); Bo Liu, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/683,174

(22) Filed: Nov. 21, 2012

(65) Prior Publication Data

US 2013/0155826 A1 Jun. 20, 2013

(30) Foreign Application Priority Data

Nov. 21, 2011 (SG) .................................. 201108615

(51) Int. Cl.

| | |
|---|---|
| *G11B 5/596* | (2006.01) |
| *G11B 27/30* | (2006.01) |
| *G11B 7/2403* | (2013.01) |
| *G11B 5/012* | (2006.01) |
| *G11B 20/16* | (2006.01) |
| *G11B 27/24* | (2006.01) |
| *G11B 20/10* | (2006.01) |
| *G11B 7/09* | (2006.01) |
| *G11B 20/12* | (2006.01) |

(52) U.S. Cl.
CPC ............ *G11B 27/3063* (2013.01); *G11B 5/012* (2013.01); *G11B 5/59616* (2013.01); *G11B 5/59655* (2013.01); *G11B 5/59688* (2013.01); *G11B 7/2403* (2013.01); *G11B 20/10046* (2013.01); *G11B 20/10222* (2013.01); *G11B 20/10259* (2013.01); *G11B 20/16* (2013.01); *G11B 27/24* (2013.01); *G11B 7/0938* (2013.01); *G11B 2020/1281* (2013.01); *G11B 2220/235* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 3,219,353 A | * | 11/1965 | Prentky .......................... 360/131 |
| 3,404,392 A | | 10/1968 | Sordello |
| 3,864,740 A | | 2/1975 | Sordello et al. |
| 4,048,660 A | | 9/1977 | Dennison et al. |
| 4,286,296 A | | 8/1981 | Cunningham |
| 4,488,188 A | | 12/1984 | Hansen et al. |
| 4,490,756 A | | 12/1984 | Dost et al. |
| 4,910,617 A | | 3/1990 | Brunnett et al. |
| 5,095,471 A | | 3/1992 | Sidman |

(Continued)

OTHER PUBLICATIONS

Search Report issued by the Danish Patent and Trademark Office for corresponding Singapore Patent Application No. 201305561-1, 8 pages, (Sep. 26, 2014).

(Continued)

*Primary Examiner* — Brian Butcher (57) ABSTRACT

Various embodiments provide a recording medium. The recording medium may include: a dedicated servo layer for providing servo information, wherein the dedicated servo layer comprises a plurality of tracks, wherein a first track comprises a first servo signal of a first frequency, wherein a second track comprises a second servo signal of a second frequency, and wherein the first servo signal and the second servo signal comprise a common single tone signal.

18 Claims, 5 Drawing Sheets

400

Generating the reference clock signal based on a plurality of tracks in a dedicated servo layer of the data storage device, wherein a first track includes a first servo signal of a first frequency, wherein a second track includes a second servo signal of a second frequency, wherein the first servo signal and the second servo signal include a common single tone signal — 402

(56) References Cited

U.S. PATENT DOCUMENTS

| | | | |
|---|---|---|---|
| 5,777,816 A | 7/1998 | Hampshire et al. | |
| 5,838,512 A * | 11/1998 | Okazaki | 360/51 |
| 5,912,778 A | 6/1999 | Kalfs et al. | |
| 6,122,117 A | 9/2000 | Aikawa | |
| 6,574,068 B1 | 6/2003 | Hampshire et al. | |
| 6,614,608 B1 | 9/2003 | Belser et al. | |
| 6,873,482 B1 | 3/2005 | Hsieh et al. | |
| 7,012,773 B2 * | 3/2006 | Ashikaga et al. | 360/48 |
| 7,710,676 B1 | 5/2010 | Chue | |
| 7,916,415 B1 | 3/2011 | Chue | |
| 7,982,994 B1 | 7/2011 | Erden et al. | |
| 8,922,926 B2 | 12/2014 | Zhang et al. | |
| 2005/0141123 A1 | 6/2005 | Roth | |
| 2010/0020435 A1 * | 1/2010 | Chen et al. | 360/77.02 |
| 2010/0328804 A1 * | 12/2010 | Yamashita et al. | 360/51 |
| 2011/0181978 A1 | 7/2011 | Rub | |
| 2012/0105994 A1 | 5/2012 | Bellorado et al. | |
| 2012/0154498 A1 | 6/2012 | Chiwata | |
| 2012/0154948 A1 * | 6/2012 | Tamai et al. | 360/75 |
| 2013/0155826 A1 | 6/2013 | Zhang et al. | |
| 2014/0139940 A1 | 5/2014 | Ong et al. | |
| 2014/0204486 A1 | 7/2014 | Zhang et al. | |

OTHER PUBLICATIONS

Written Opinion issued by the Danish Patent and Trademark Office for corresponding Singapore Patent Application No. 201305561-1, 11 pages, (Sep. 26, 2014).

Search Report and Written Opinion received for Singapore Application No. 201305431-7 dated Sep. 26, 2014, 18 pages.

* cited by examiner

Fig. 1A

(Prior Art)

Fig. 1B

(Prior Art)

Generating the reference clock signal based on a plurality of tracks in a dedicated servo layer of the data storage device, wherein a first track includes a first servo signal of a first frequency,
wherein a second track includes a second servo signal of a second frequency,
wherein the first servo signal and the second servo signal include a common single tone signal

DATA RECORDING MEDIUM, METHOD FOR GENERATING A REFERENCE CLOCK SIGNAL, AND DATA STORAGE DEVICE

CROSS-REFERENCE TO RELATED APPLICATIONS

The present application claims the benefit of the Singapore patent application 201108615-4 filed on Nov. 21, 2011, the entire contents of which are incorporated herein by reference for all purposes.

TECHNICAL FIELD

Embodiments relate generally to a data storage medium, a method for generating a reference clock signal, and a data storage device. Specifically, embodiments relate to a data storage device having a dedicated servo layer, and to a method for generating a reference clock signal for synchronization of read and write operations of a data storage device.

BACKGROUND

Electronic devices, including mobile computing and/or communication devices, are becoming smaller thereby driving the weight and size of data storage devices down, while requiring large storage capacity in the terabyte range and low power consumption. An increasing storage capacity would require the need for increased precision in tracking the movement of the read/write head.

Figure 1A:
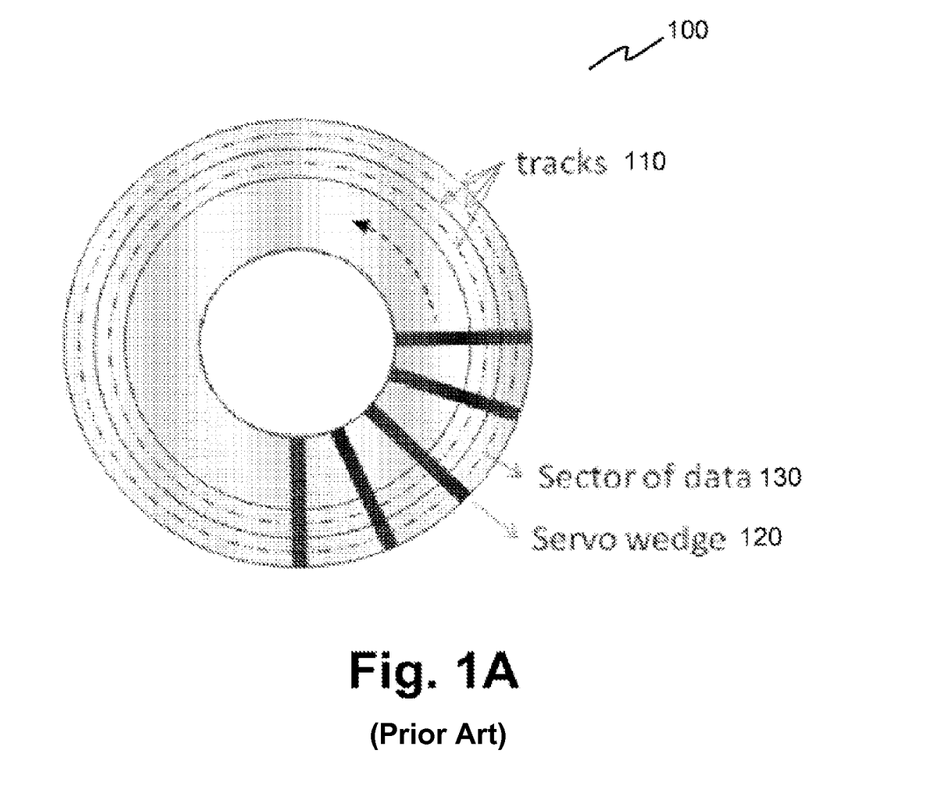
FIG. 1A shows a disk surface with embedded servo.

Data storage devices, for example hard disk drives (HDDs), employ servo systems for tracking and controlling the movement of the read/write head. Conventional servo systems, e.g., as shown in FIG. 1A, employ embedded servo where the servo information runs radially across the tracks 110 from the inner diameter (ID) to the outer diameter (OD) of the disc 100 in a series of "servo wedges" 120 interspersed with data 130. Therefore, the servo information is only detected when the read/write head moves over these servo wedges 120. In between the servo wedges, no servo information is received by the head.

Figure 1B:
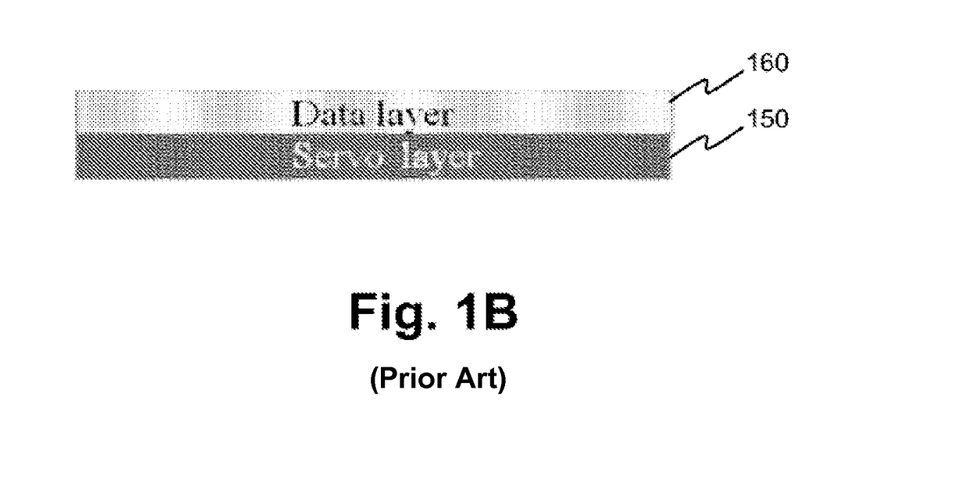
FIG. 1B shows a dual layer medium with dedicated servo.

Data storage devices also employ dedicated servo, e.g. as shown in FIG. 1B, where the servo information is provided on a servo layer 150 distinct from the data recording layer 160. In addition, conventional servo systems typically employs ABCD servo-burst-signal pattern.

Furthermore, in conventional hard disk drives and similar data storage devices, the head either reads or writes, but cannot perform both operations simultaneously.

SUMMARY

Various embodiments provide a recording medium. The recording medium may include: a dedicated servo layer for providing servo information, wherein the dedicated servo layer includes a plurality of tracks, wherein a first track includes a first servo signal of a first frequency, wherein a second track includes a second servo signal of a second frequency, and wherein the first servo signal and the second servo signal includes a common single tone signal.

Various embodiments provide a method for generating a reference clock signal for synchronization of at least one of a read operation and a write operation of a data storage device. The method may include: generating the reference clock signal based on a plurality of tracks in a dedicated servo layer of the data storage device, wherein a first track includes a first servo signal of a first frequency, wherein a second track includes a second servo signal of a second frequency, and wherein the first servo signal and the second servo signal include a common single tone signal.

Various embodiments provide a data storage device. The data storage device may include: a clock reference generation circuit configured to generate a reference clock signal for synchronization of at least one of a read operation and a write operation of a data storage device, wherein the clock reference generation circuit is configured to generate the reference clock signal based on a plurality of tracks in a dedicated servo layer of the data storage device, wherein a first track include a first servo signal of a first frequency, wherein a second track include a second servo signal of a second frequency, and wherein the first servo signal and the second servo signal include a common single tone signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

In general, a head-positioning servomechanism is provided in a data storage device, e.g. a hard disk drive (HDD), which acts as a control system. The control system may position the head (e.g. read/write (R/W) head) which is mounted on an actuator over a desired data track of a storage medium and reposition the head from one data track to another.

In a HDD servo control system, the position of the head relative to the center of the desired data track, and therefore the position error signal (PES), may be sensed and used by the servo system to generate the appropriate commands to the actuator, which in turn moves the head in an effort to reduce the position error. PES is a signal proportional to the relative difference of the positions of the centre of the head and the nearest track centre. Therefore, the PES may provide an indication of the position of the head relative to the storage medium, for example the position of the head relative to a data track, and whether the head is positioned at the centre of the data track (on track) or shifted relative to the centre of the data track (off track) and the magnitude of the shift, such that the position of the head may then be adjusted.

In a dedicated servo implementation, one disk surface (servo layer) is dedicated to store the position data referred to as servo data or servo signal. The servo layer may be a buried layer arranged beneath the data recording layer and may have a perpendicular or a longitudinal magnetization orientation for providing magnetic information for determining the location of the head in relation to the storage medium. The servo information is provided on the servo layer distinct from the data recording layer so as to allow continuously available servo readback to enable continual position feedback thereby providing continual location detection without utilizing any of the recording layer for location detection. This may provide higher positioning accuracy through continual location determination, while also removing the servo sectors/tracks from the recording layer, thereby increasing surface utilization of the storage space in the recording layer and further increasing the data recording density by increasing the track positioning accuracy. Further, the servo layer and data layer may be put on the same side and they may be read and/or processed together; this may also be referred to as dedicated servo.

Figure 2A:
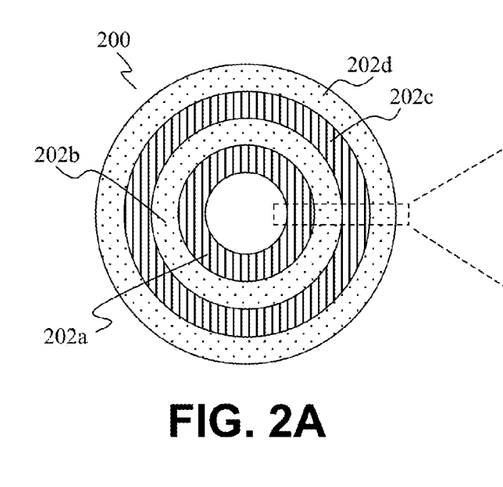
FIGS. 2A and 2B show a recording medium according to various embodiments.
Figure 2B:
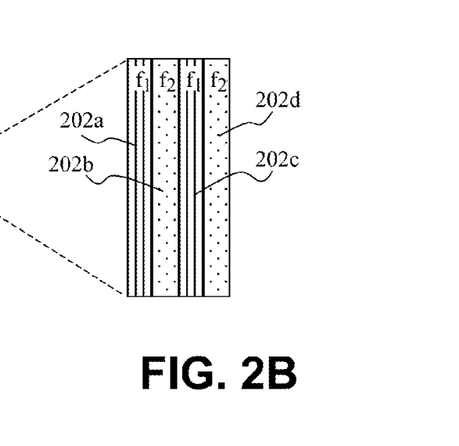

The dedicated servo layer may have a continuous track structure having a plurality of servo tracks in a concentric arrangement. Adjacent servo tracks may be alternately assigned different frequency signals, having respective frequencies $f_1$ and $f_2$, as illustrated in FIGS. 2A and 2B for a portion of the servo layer 200 towards its inner diameter, showing four servo tracks 202a, 202b, 202c, 202d. In this configuration, the head of the data storage device may be positioned in between two adjacent tracks (e.g. 202a and 202b; 202b and 202c), for example at the boundary of the two adjacent tracks, and may be able to obtain a readback servo signal having frequencies $f_1$ and $f_2$.

Therefore, in various embodiments of a dedicated servo system, each servo track has a single frequency. The position error signal (PES) may be produced from the frequency based servo signal, including dual/triple frequency based signals. Using the dual frequency based servo signal as an example, during track following, the center of the head may be positioned at the middle of two adjacent servo tracks, whereby the head picks up a readback servo signal having two frequencies from the two adjacent servo tracks at the same time.

For a data storage device with an embedded servo, the clock used to trig the write buffer is a free-run fixed clock during the writing of data. In order to decode the sequential readback data correctly, timing recovery is needed to generate a synchronization signal such that the readback data is sampled synchronously. The timing recovery is done by including a preamble in front of the data sectors and scrambling the user data, wherein the preamble is used to initialize a digital phase lock loop (DPLL) and the scrambling is used to prevent transitions in user data which may cause the DPLL to lose the phase lock. The scrambling of user data may reduce the coding efficiency for the read write channel.

The data storage device may include a memory which is for example used in the processing carried out by the data storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In the context of various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the context of various embodiments, the data storage device may be a hard disk drive (HDD).

In the context of various embodiments, the term "head" may include a magnetic head. In addition, the "head" may refer to the read/write head for reading/writing information or data from/to a storage/recording medium. The head includes a reader and a writer. The head is positioned over a storage medium and the reader may read signal or information from the storage medium and the writer may write information to the storage medium.

In the context of various embodiments, a data storage device includes a spindle which refers to a mechanical part, which may be rotatable, and that may serve as an axis for a rotatable part held by the spindle. As a non-limiting example, in a hard disk drive, the spindle holds a circular disk (or platter) as storage medium that holds data. A spindle index signal is generated each time the spindle makes a rotation, thereby providing an indication that the spindle has made one rotation (360-degree rotation) in a period between the generation of one spindle index signal and the generation of the next spindle index signal.

Various features described herein in the context of the data storage device may analogously hold true for the method of generating a reference clock signal for synchronization of at least one of a read operation or a write operation of a data storage device, and vice versa.

Various features described above in the context of the method of generating a reference clock signal for synchronization of at least one of read and write operations of a data storage device may analogously hold true for the corresponding device for generating the reference clock signal.

According to various embodiments, devices and methods for synchronized writing and reading for TDMR (two dimensional magnetic recording) by dedicated servo may be provided.

Various embodiments generally relate to a field of high-density magnetic data storage system and device, more particularly, to a hard disk drive that records data with reduced number of grains per bit at lower media signal to noise ratio (SNR).

The conventional magnetic recording system may encode the data with sequence correlation in a data sector along the track direction. This data correlation may enhance the data packing ratio and may record data at high recording density. The error correction coding (ECC) scheme may enable the correct data detection at lower system signal to noise ratio (SNR).

The two dimensional magnetic recording (TDMR) may not only correlate data along one data track, but also may build up the data correlation among adjacent tracks. The extra dimension of data correlation may improve the error correction capability significantly. It may detect the correct data at much lower system SNR and may enable high areal density of magnetic recording.

The TDMR may reproduce the data in page. It may require the data of adjacent tracks to be written and read synchronously at the precision below 1T bit length. The data bits recorded in the medium are encoded into different lengths of bits depending on the user data. The shortest length of the bits is defined as the 1T bit length. The rest of the bit lengths is in the multiple of 1T bit length. There are 2T bit length, 3T, 4T, . . . , nT bit lengths. Usually, the linear density of recording system is calculated based on 1T bit length. In the conventional magnetic recording system, there may be no continuous reference signals for the read/write heads to conduct synchronized reading and writing.

Figure 3:
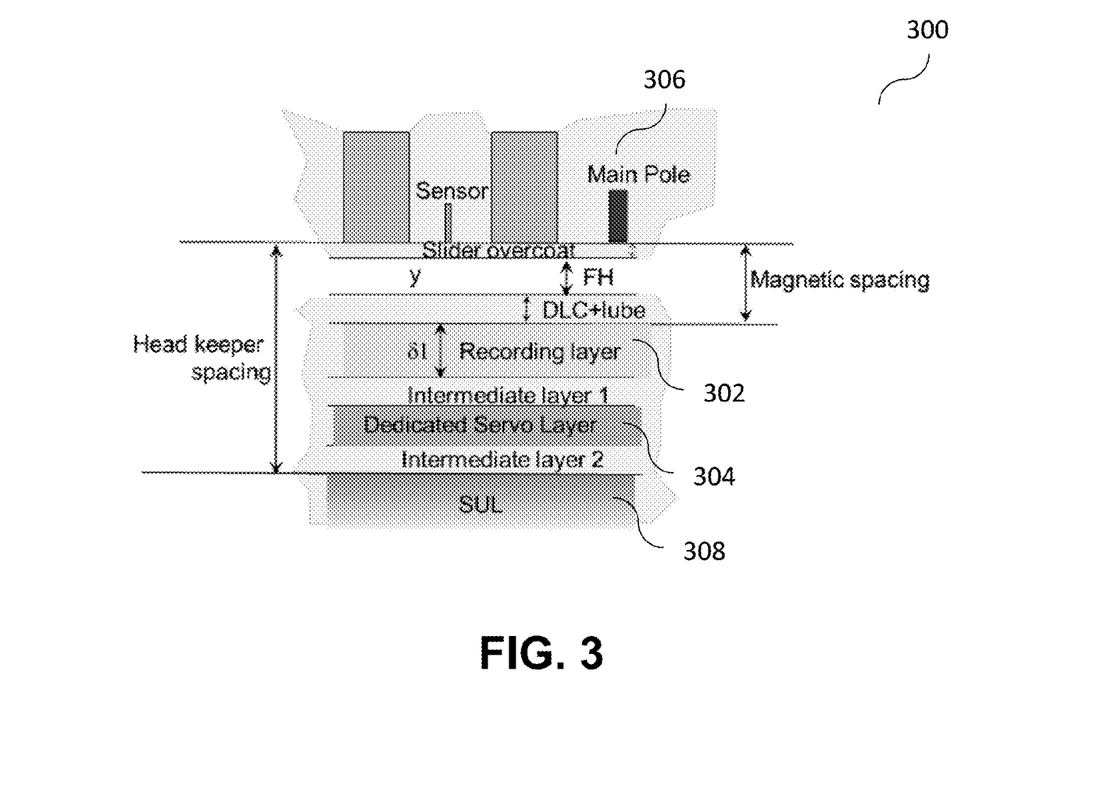
FIG. 3 shows a dedicated servo system with a dual recording layer medium and the conventional read/write heads.

FIG. 3 shows the structure and system configuration of magnetic recording medium with dedicated servo layer. FIG. 3 shows a dedicated servo system 300 having a magnetic data layer 302, and a physically separate magnetic layer as a dedicated servo layer 304 for storing the servo information. However, a writing field from a recording/writing head 306 may affect the magnetic data layer 302 only. The writing field is not strong enough to affect the dedicated servo layer 304. In other words, the servo information in the servo layer 304 cannot be overwritten by the writing field. FIG. 3 shows the structure and system configuration of magnetic recording medium with dedicated servo.

Thus, it is desirable that the servo layer 304 has a nucleation field which is high enough to be unaffected by the writing field for writing data on the magnetic data layer 302 (in other words, unlimited writing on the magnetic data layer 302). Therefore, the switching field of the servo layer 304 should be large so that it is harder to write on the servo layer 304 than the magnetic data layer 302. The servo information at servo layer is written once only with a different wide magnetic head. The wide servo writing head may provide a strong enough field to write the servo layer.

Further, it is also desirable to place the servo layer 304 below the magnetic data layer 302. The servo layer 304 is arranged further from the recording/writing head 306 than the magnetic data layer 302. The head field decay to the servo layer 304 is larger due to the larger magnetic space from the recording/writing head 306 to the servo layer 304. The head field decay to the servo layer 304 may still be large even if a soft underlayer 308 is arranged below the servo layer 304. The head field at servo layer should be less than the magnitude of nucleation field of servo layer. Therefore, the writing of data layer does not affect the signal integrity of servo information.

As such, it becomes more difficult to write servo information onto the servo layer 304. A conventional recording/writing head may not be able to write servo information onto the servo layer 304 without using a special writing head, such as, a wide magnetic head, or a small size magnetic head with energy assisted writing. Further, energy assisted writing may pose complexities and problems for writing onto the servo layer 304. A special energy assist recording/writing head may not be readily available.

With the dedicated servo layer, the majority or all of servo information may be moved from data recording layer to the servo layer. With more area for servo signals, the increased servo sampling rate and the improved signal to noise ratio of servo positioning signal may increase the track density significantly.

According to various embodiments, a recording medium may be provided. The recording medium may include a dedicated servo layer for providing servo information. The dedicated servo layer may include a plurality of tracks. A first track (of the dedicated servo layer) may include a first servo signal of a first frequency. A second track (of the dedicated servo layer) may include a second servo signal of a second frequency. The first servo signal and the second servo signal may include a common single tone signal (in other words: a common clock signal).

The single tone signal may include a common signal on a cross track direction.

Each servo signal may include or may be information for providing positioning information.

According to various embodiments, a data storage device may be provided. The data storage device may include the recording medium.

The recording medium may further include a data layer configured to record data therein.

The data storage device may further include a phase lock loop circuit configured to generate a reference clock signal for synchronization of at least one of read and write operations, based on the servo signals.

Figure 4:
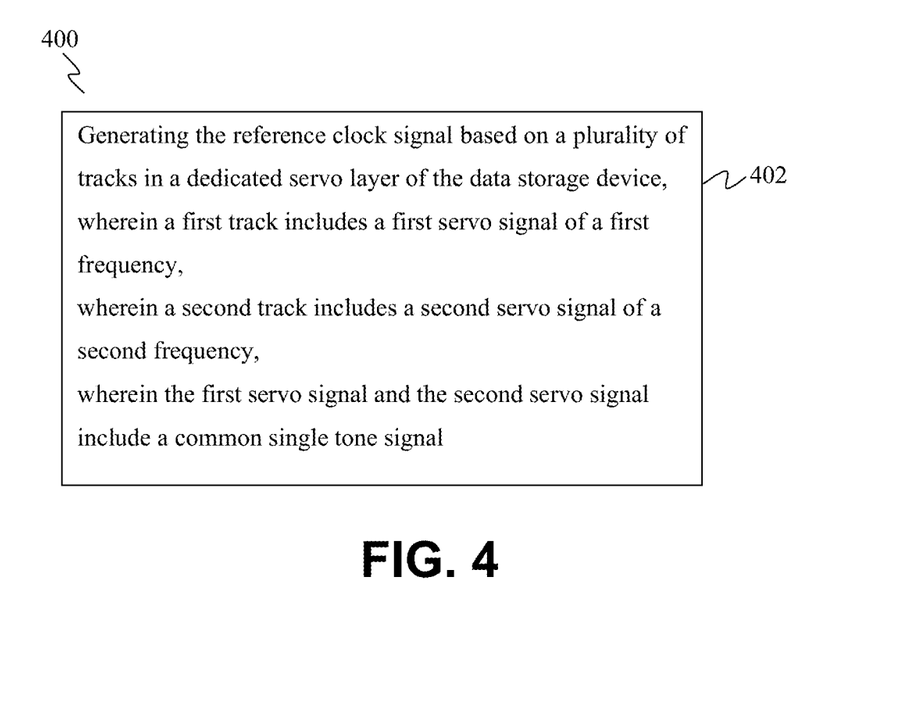
FIG. 4 shows a flow diagram illustrating a method for generating a reference clock signal according to various embodiments.

FIG. 4 shows a flow diagram 400 illustrating a method for generating a reference clock signal according to various embodiments, for example a method for generating a reference clock signal for synchronization of at least one of a read operation and a write operation of a data storage device. In 402, the reference clock signal may be generated based on a plurality of tracks in a dedicated servo layer of the data storage device. A first track may include a first servo signal of a first frequency. A second track may include a second servo signal of a second frequency. The first servo signal and the second servo signal may include a common single tone signal.

The method may further include initializing a phase lock loop circuit upon reading of the first signal and the second signal, so as to generate the reference clock signal synchronous with the pre-determined frequency.

Figure 5:
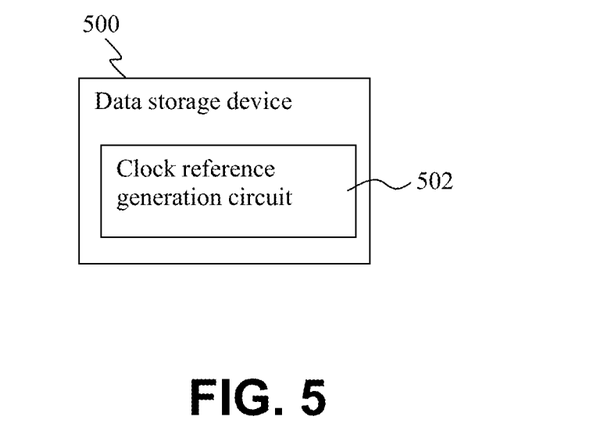
FIG. 5 shows a data storage device according to various embodiments.

FIG. 5 shows a data storage device 500 according to various embodiments. The data storage device 500 may include a clock reference generation circuit 502 configured to generate a reference clock signal for synchronization of at least one of a read operation and a write operation of a data storage device. The clock reference generation circuit 502 may be configured to generate the reference clock signal based on a plurality of tracks in a dedicated servo layer of the data storage device. A first track of the servo layer may include a first servo signal of a first frequency. A second track of the servo layer may include a second servo signal of a second frequency. The first servo signal and the second servo signal may include a common single tone signal.

The clock reference generation circuit may include or may be a phase lock loop.

The data storage device 500 may further include at least two readers configured to provide synchronized reading by reading of two tracks of data at the same time.

The data storage device 500 may further include an array of multiple readers configured to provide synchronized reading by reading of multiple tracks of data at the same time.

Figure 6:
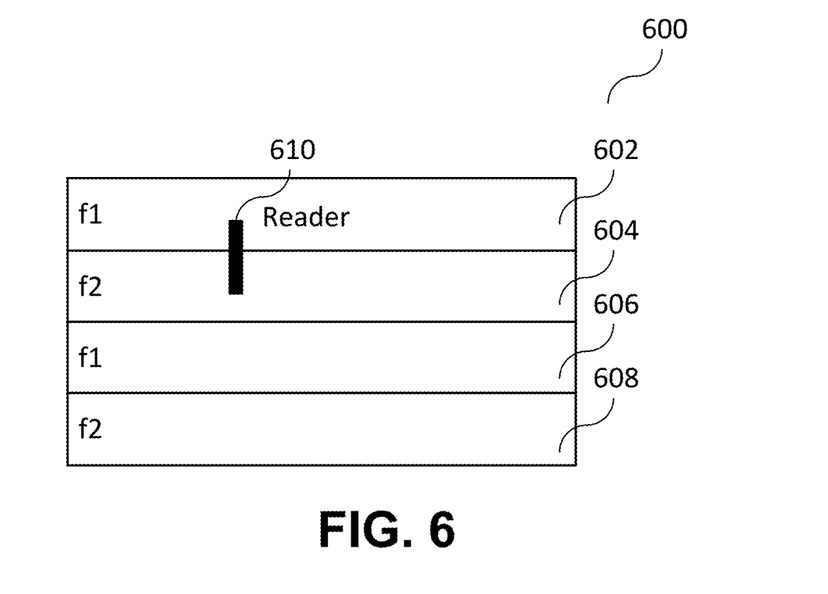
FIG. 6 shows servo information in accordance with various embodiments.

The servo signals in dedicated servo layer may include the single tone signal at two frequencies and may appear alternatively as shown in FIG. 6.

FIG. 6 shows a diagram 600 illustrating the servo signals in dedicated servo layer, which may include the single tone signal in two frequencies and may appear alternatively. A reader 610 is shown. In a first track 602, a first frequency $f_1$ may be provided. In a second track 604, a second frequency $f_2$ may be provided. In a third track 606, the first frequency $f_1$ may be provided. In a fourth track 608, the second frequency $f_2$ may be provided.

Figure 7:
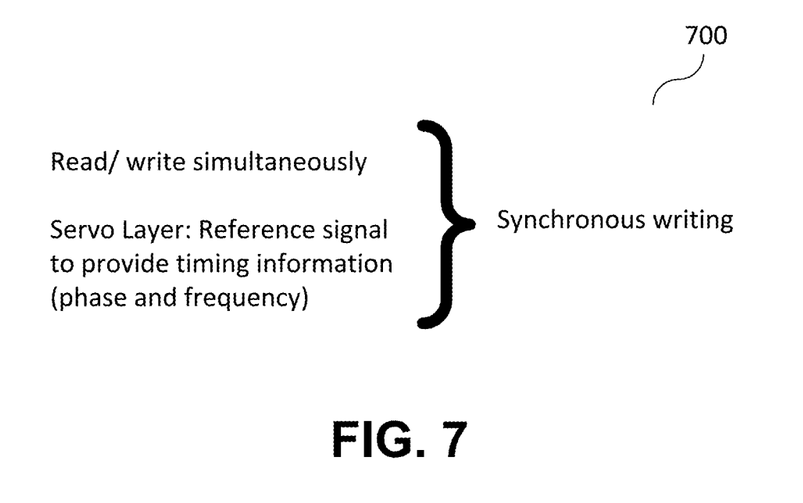
FIG. 7 shows a diagram illustrating synchronous writing in accordance with various embodiments.

During the track following, the reader may stay at the middle of two servo tracks and may produce the positioning error signal (PES). A reference signal may be generated from the servo signal with phase and frequency information related to the location of the data track. The reference signal may used for synchronized writing of data signal as shown in an illustration 700 of FIG. 7, according to which the servo signal in dedicated servo layer may be used to provide timing information with both phase and frequency for synchronous writing and reading.

Figure 8:
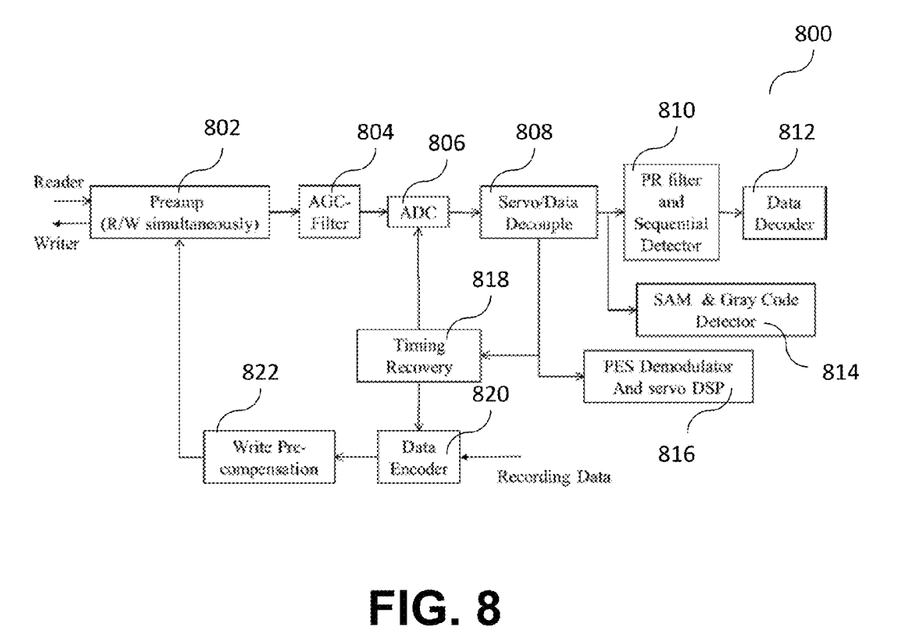
FIG. 8 shows a block diagram of a device for synchronization according to an embodiment.

The write synchronization may be implemented by a system like shown in FIG. 8.

FIG. 8 shows a system 800 of electronics function blocks to implement the write synchronization.

A pre-amplifier 802 may be used to readback data from dedicated servo layer, which is used for timing recovery. When writing data layer, the writing data buffer may be triggered by recovered clock from a digital PLL instead of free-run clock. The data may be read back through the pre-amplifier 802, passes to AGC (automatic gain control; for example AGC filter) 804 to normalize the signal amplitude, filter to reduce the noise in other frequency bands, and then may pass through flash ADC (analog digital converter) 806. The readback signal may include both signals from data layer and dedicated servo layer and or the coupling writing signals. They may separated in a servo/data decouple circuit 808. The data signal may pass through data channel for data decoder 812, and SAM grey code detector 814. A servo signal may be used for PES demodulator 816 to get PES signal. The servo signal may also be used for digital PLL to do timing recovery (for example in a timing recovery circuit 818).

With the timing recovery signal, the writing data may be synchronized with the track location. Passing through the conventional writing pre-compensation module 822, the data may be translated into the writing waveform and may be written into data layer through pre-amplifier 802. In block 810, the PR filter implements the partial response function to remove the modulation noise of the readback signal for data detection. The sequential detector in block 810 recovers the timing of readback signal from the sequential data patterns. The block 810 converts the raw readback signal into the timing recovered and equalized readback signal for further data detection. The data encoder 820 encodes the user data into the coded data with the timing signal referring to the precise locations of data track.

As all the track writing may synchronize with the track location information precisely, the bit alignment along cross track direction may be possible. The cross track correlation may be built up by above writing scheme. With the partial blocks excluding the data recording path in FIG. 8, the timing recovery during the reading process may be done in the same way.

With the precise location along down track direction, the recording bits may be aligned precisely in 2 dimensions, both down track and cross track directions. This may ensure the coding correlation of recording bits in 2 dimensions. The system SNR may be allowed to be significant low at the same bit error rate.

According to various embodiments, devices and methods may be provided for synchronized writing and reading for TDMR by dedicated servo.

The two dimensional magnetic recording (TDMR) may create the data correlation among adjacent tracks. The data page based encoding and decoding scheme may be able to tolerate very low SNR of recording system.

In order to fully benefit the advantage of TDMR, the recording data at different tracks may be desired to be synchronized at bit level for both writing and reading process.

The dedicated servo with continuous frequency based servo signals at entire disk surface may provide the frequency based signals on every data track. Those frequency signals may be processed as the clock signal for the phase lock loop to synchronize the writing and reading at any track of the disk medium.

According to various embodiments, devices and methods may be provided which may provide a technology for synchronous writing.

According to various embodiments, a sequence of data may be divided into multi-rows and may become a page of data. Before the data are written into recording medium, the error correction coding schemes may be applied to both dimensions of the page data. The extra dimension of error correction coding may allow the recording system to record and playback data at desired bit error rate in significant lower signal to noise ratio (SNR) of recording system.

According to various embodiments, two tracks of data can be read by two readers simultaneously in order to increase the data rate and also implement synchronized reading of two tracks without using the synchronized signal from dedicated servo layer. Also, multiple tracks of data can be read by an array of multiple readers simultaneously for the increased data rate and also the synchronized reading of multiple tracks without using the synchronized signal from dedicated servo layer.

According to various embodiments, the first row of data may be recorded along down track direction in the first track. The second row of data may be recorded in the next track with all the bit clocks synchronized with the corresponding bit clock in the first track. Following the same scenario, the rest rows of data may be recorded with all the bit clocks synchronized along cross track direction.

According to various embodiments, each data track may have a location reference signal along down track direction. The reference signal may be served as a clock signal for the phase lock loop to synchronize the data writing.

According to various embodiments, the frequency based servo signals from dedicated servo may be used to generate the clock signal for synchronized writing in magnetic recording system.

According to various embodiments, the reference clock may be used for synchronized reading in the magnetic recording system.

According to various embodiments, the synchronized reading may be done by the recovered clock from data signal only.

According to various embodiments, the information at servo layer may be used for timing recovery and may enable synchronously writing such that align the written data on adjacent tracks to reduce the inter-track inference (ITI).

According to various embodiments, the information at servo layer may be used for timing recovery and may enable synchronously sample the read-back recording bits for TDMR for decoding.

While the invention has been particularly shown and described with reference to specific embodiments, it should be understood by those skilled in the art that various changes in form and detail may be made therein without departing from the spirit and scope of the invention as defined by the appended claims. The elements of the various embodiments may be incorporated into each of the other species to obtain the benefits of those elements in combination with such other species, and the various beneficial features may be employed in embodiments alone or in combination with each other. The scope of the invention is thus indicated by the appended claims and all changes which come within the meaning and range of equivalency of the claims are therefore intended to be embraced.

What is claimed is:

1. A recording medium comprising:
   a data recording layer configured to store data written, by a read/write head, to the data recording layer; and
   a servo layer that (i) is physically separate from the data recording layer, and (ii) is arranged beneath the data recording layer, wherein the servo layer includes
      a first servo track configured to store (i) first position data in accordance with a first frequency, and (ii) in addition to the first position data, a clock signal in accordance with the first frequency and
      a second servo track configured to store (i) second position data in accordance with a second frequency, and (ii) in addition to the second position data, the clock signal in accordance with the second frequency, wherein the second frequency is different than the first frequency, and wherein the second position data is different than the first position data,
   wherein a position of the read/write head over the data recording layer is determinable based on one or more of (i) the first position data stored on the first servo track in accordance with the first frequency and (ii) the second position data stored on the second servo track in accordance with the second frequency, and wherein a reference clock signal based on which the read/write head reads or writes data on the data recording layer is based on both (i) the clock signal stored on the first servo track at the first frequency, and (ii) the clock signal stored on the second servo track at the second frequency.

2. The recording medium of claim 1, wherein the position of the read/write head over the data recording layer is determinable based on a simultaneous sensing of both (i) the first position data stored on the first servo track in accordance with the first frequency and (ii) the second position data stored on the second servo track in accordance with the second frequency.

3. A data storage device comprising the recording medium of claim 1.

4. The data storage device of claim 3, further comprising a clock reference generation circuit configured to generate the reference clock,
   wherein the read/write head is configured to read or write the data stored on the data recording layer based on the reference clock.

5. A method of operating a data storage device, wherein the data storage device comprises a read/write head and a recording medium, wherein the recording medium comprises (i) a data recording layer configured to store data written, by the read/write head, to the data recording layer, and (ii) a servo layer that (a) is physically separate from the data recording layer, and (b) is arranged beneath the data recording layer, wherein the servo layer includes (1) a first servo track configured to store first position data in accordance with a first frequency, and (2) a second servo track configured to store second position data in accordance with a second frequency, wherein the second position data is different than the first position data, wherein the first servo track is configured to store, in addition to the first position data, a clock signal in accordance with the first frequency, wherein the second servo track is configured to store, in addition to the second position data, the clock signal in accordance with the second frequency, and wherein the second frequency is different than the first frequency, the method comprising:
   reading the first position data on the first servo track while reading the second position data on the second servo track;
   determining a position of the read/write head over the data recording layer based on (i) the first position data stored on the first servo track in accordance with the first frequency, and (ii) the second position data stored on the second servo track in accordance with the second frequency; and
   reading or writing the data to the data recording layer based on (i) the determined position of the read/write head over the recording medium, and (ii) a reference clock signal generated based on both (a) the clock signal stored on the first servo track at the first frequency, and (b) the clock signal stored on the second servo track at the second frequency.

6. The method of claim 5, further comprising, based on the first servo track and the second servo track, initializing a phase lock loop circuit to synchronize a reference clock signal with a predetermined frequency.

7. A data storage device comprising:
   the recording medium of claim 1;
   the read/write head configured to (i) read the first servo track while reading the second servo track, and (ii) generate a read signal including a first servo signal and a second servo signal, wherein the first servo signal includes, at the first frequency, (i) the first position data, and (ii) the clock signal, and wherein the second servo signal includes, at the second frequency (i) the second position data, and (ii) the clock signal; and
   a clock reference generation circuit configured to, based on the clock signal at the first frequency and the clock signal at the second frequency, generate the reference clock signal for synchronizing the reading or the writing of the data to the data recording layer.

8. The data storage device of claim 7, wherein the clock reference generation circuit comprises a phase lock loop.

9. The data storage device of claim 7, comprising at least two readers configured to provide synchronized reading by reading a first track of the data recording layer while reading a second track of the data recording layer.

10. The data storage device of claim 7, further comprising an array of readers configured to provide synchronized reading by simultaneously reading a plurality of tracks of the data recording layer.

11. The recording medium of claim 1, wherein:
    the servo layer comprises a plurality of servo tracks;
    the plurality of servo tracks comprise the first servo track and the second servo track; and
    the plurality of servo tracks are ring-shaped and concentric.

12. The recording medium of claim 11, wherein:
    the plurality of servo tracks comprise a first set of tracks and a second set of tracks;
    in a radial direction across the recording medium, every other one of the plurality of servo tracks is one of the first set of tracks and remaining ones of the plurality of servo tracks are the second set of tracks;
    first servo information stored on the first set of tracks is stored at the first frequency;
    the first servo information includes the first position data;
    second servo information stored on the second set of tracks is stored at the second frequency; and
    the second servo information includes the second position data.

13. The recording medium of claim 1, further comprising:
    a first intermediate layer disposed between the data recording layer and the servo layer; and
    a second intermediate layer, wherein the servo layer is disposed on the second intermediate layer, and wherein the second intermediate layer is on an opposite side of the servo layer than the first intermediate layer.

14. The recording medium of claim 13, further comprising:
an underlayer, wherein the second intermediate layer is disposed on the underlayer; and
an upper layer disposed on the data recoding layer, wherein the upper layer comprises a diamond-like carbon material.

15. The method of claim 5, wherein:
the servo layer comprises a plurality of servo tracks;
the plurality of servo tracks comprise the first servo track and the second servo track; and
the plurality of servo tracks are ring-shaped and concentric.

16. The method of claim 15, wherein:
the plurality of servo tracks comprise a first set of tracks and a second set of tracks;
in a radial direction across the recording medium, every other one of the plurality of servo tracks is one of the first set of tracks and remaining ones of the plurality of servo tracks are the second set of tracks;
first servo information stored on the first set of tracks is stored at the first frequency;
the first servo information includes the first position data;
second servo information stored on the second set of tracks is stored at the second frequency; and
the second servo information includes the second position data.

17. The method of claim 5, wherein the recording medium comprises:
a first intermediate layer disposed between the data recording layer and the servo layer; and
a second intermediate layer, wherein the servo layer is disposed on the second intermediate layer, and wherein the second intermediate layer is on an opposite side of the servo layer than the first intermediate layer.

18. The data storage device of claim 7, further comprising:
an analog to digital converter configured to, based on the reference clock signal, convert the read signal to a digital signal;
a decouple circuit configured to generate the first servo signal or the second servo signal based on the digital signal;
a phase lock loop configured to generate the reference clock signal based on the servo signal;
a demodulator configured to generate a position error signal based on the servo signal;
a processor is configured to determine a position of the read/write head relative to the recording medium based on the position error signal; and
an actuator configured to move the read/write head relative to the recording medium based on the position of the head.

* * * * *